(12) United States Patent
Winch et al.

(10) Patent No.: US 6,310,783 B1
(45) Date of Patent: Oct. 30, 2001

(54) MODULAR METHOD AND APPARATUS FOR BUILDING AN UNINTERRUPTIBLE POWER SYSTEM (UPS)

(75) Inventors: Cary Winch, Necedah; David Layden, New Lisbon; Craig Edevold, Tomah, all of WI (US)

(73) Assignee: Powerware Corporation, Raleigh, NC (US)

( * ) Notice: Subject to any disclaimer, the term of this patent is extended or adjusted under 35 U.S.C. 154(b) by 0 days.

(21) Appl. No.: 09/538,053

(22) Filed: Mar. 29, 2000

(51) Int. Cl.$^7$ ..................................................... H05K 7/14
(52) U.S. Cl. .......................... 361/797; 361/724; 361/725; 361/726; 361/727; 361/683; 361/684; 361/685; 361/686; 361/694; 361/695
(58) Field of Search ..................................... 361/797, 643, 361/724, 697, 752, 741, 727, 725, 726, 690, 695, 683–686, 694

(56) References Cited

U.S. PATENT DOCUMENTS 5,982,652   11/1999   Simonelli et al. .................... 363/142

*Primary Examiner*—Jeffrey Gaffin
*Assistant Examiner*—Thanh Y. Tran
(74) *Attorney, Agent, or Firm*—Leydig, Voit & Mayer, Ltd.

(57) ABSTRACT

An electrical cabinet or chassis for an uninterruptible power system (UPS system) includes universal bays or slots that can receive either power modules or battery backs. The back plane of the slot has separate connector terminals for battery packs and power modules. The slots may also receive battery chargers if so desired. All of the slots of a chassis can be utilized to full capacity before another cabinet needs to be employed. The cabinet is also readily adaptable and can be easily reconfigured as desired without particular concern as to the number of power modules or battery packs that are being used. Sensors are provided which indicate the capacity of the cabinet that has been used (e.g. the number of slots still open and not used by a power module or a battery pack). The sensors also indicate whether a battery pack, power module or other device is inserted into the slot, and whether it is properly inserted, thereby providing an indication of the specifications of the UPS system as presently configured to the user.

32 Claims, 4 Drawing Sheets

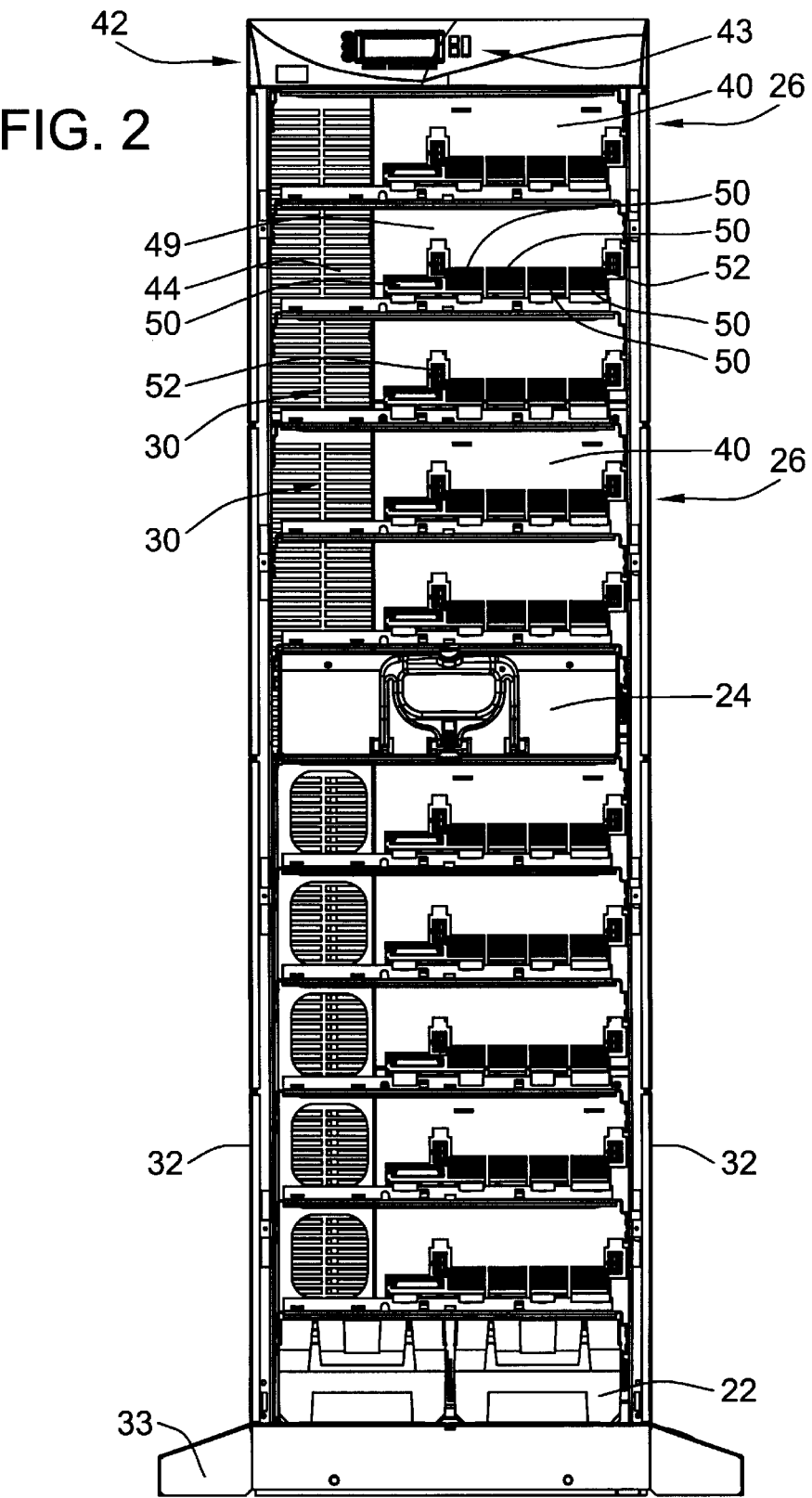

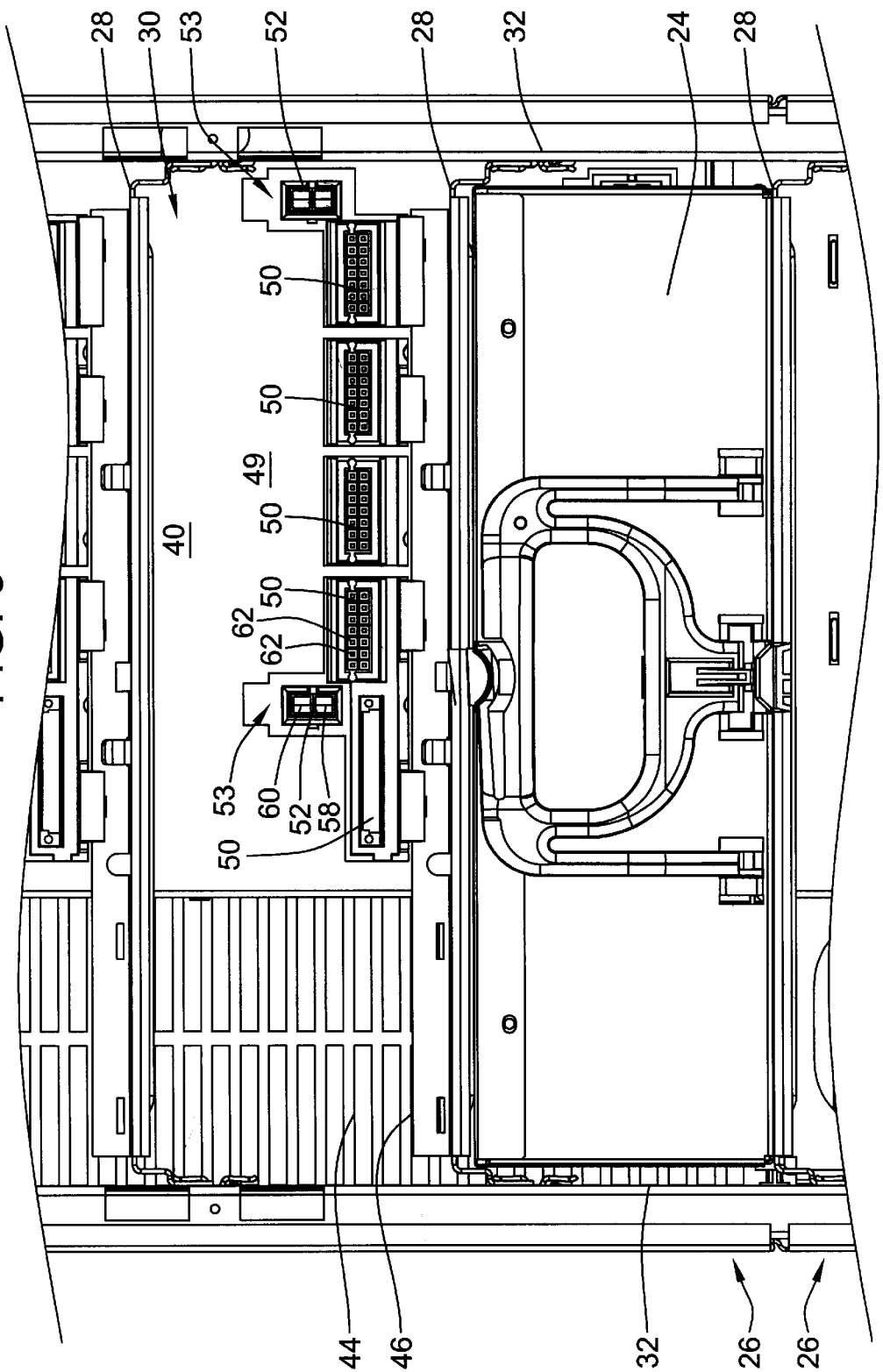

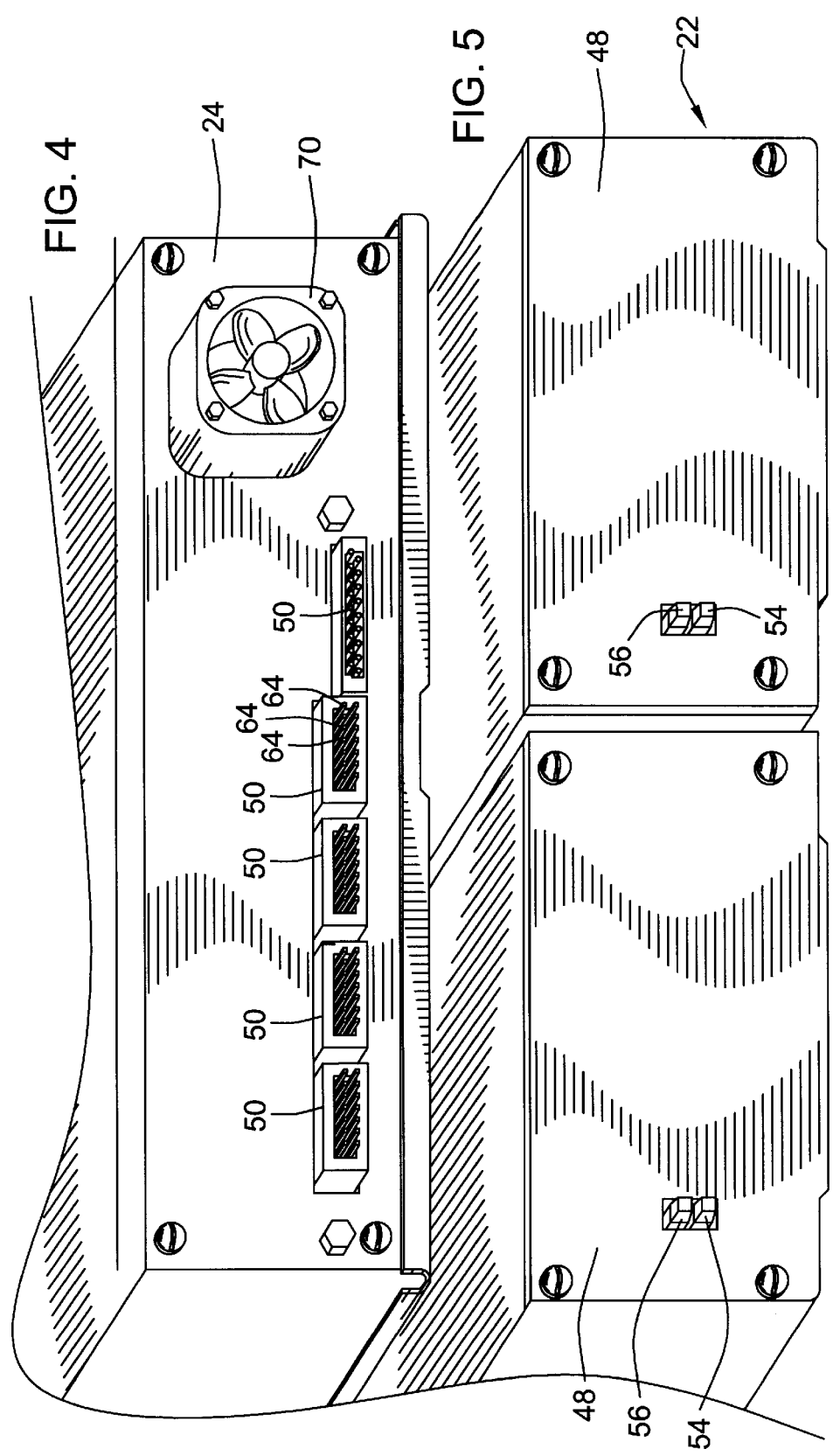

MODULAR METHOD AND APPARATUS FOR BUILDING AN UNINTERRUPTIBLE POWER SYSTEM (UPS)

FIELD OF THE INVENTION

The present invention generally relates to electrical power supply sources and systems, and more particularly relates to uninterruptible power systems (UPS) and methods of building the same with a chassis or cabinet using such things as battery strings, power modules, or battery chargers.

BACKGROUND OF THE INVENTION

Uninterruptible power supply systems typically referred to as "uninterruptible power systems" or "UPS systems" are used for a wide variety of purposes. One exemplary purpose is to provide regulated, continuous, uninterrupted power for sensitive and critical applications such as an extensive network of computers. Another common use for UPS systems is to provide power protection for telecommunications equipment. Because the applications vary greatly in their type, size and configuration, powering requirements, signal requirements and the like, it will be readily appreciated to those skilled in the art that one size fits all does not apply and that one size and form of an uninterruptible supply systems can not meet the requirements of all applications. Indeed, it is often the case that each application requires a significantly different configuration of an UPS system.

The two basic components used in UPS systems include battery packs and power modules. It is also desirable in certain applications to use battery chargers in the UPS systems. Battery packs have positive and negative terminals which can be connected together in parallel or series to provide the desired combined DC voltage and amperage. Power modules are much different than battery packs and can serve the purpose of signal conditioning and converting DC electrical power into AC electrical power. Because power modules are typical controlled through electrical signals, power modules have several inputs and several outputs. As such, power modules use much more complex terminal connectors than battery packs with several input pins and several output pins.

UPS systems are built using a chassis or cabinet that serve the purpose of organizing and supporting vertical stacks of battery packs and power modules. One such cabinet is illustrated in U.S. Pat. No. 5,982,652. In prior art systems such as this, the cabinets have provided separate bays or slots for receiving the battery packs and separate slots for the power modules. For example, FIG. 5 of the '652 patent illustrates a cabinet that can receive up to four battery modules and up to five power modules. The inventor of the present invention has realized that this type of chassis has its drawbacks. In particular, although this configuration may be sufficient for applications which need a combination between one and five power modules and one and five battery modules, it is insufficient for other combinations which exceed either the maximum number of power modules or battery modules. For example, the chassis disclosed in FIG. 5 of the '652 patent would not work for a configuration which required six or seven battery modules and only two or three power modules. Also, an end user may not able to expand a system further to increase power supply capabilities if either of the battery module bays or the power module bays are full even though empty bays exist.

SUMMARY OF THE INVENTION

It is the primary object of the present invention to provide a more modular cabinet or chassis for a UPS system that can be adapted to hold more combinations of battery packs or power modules.

The present invention is directed at a cabinet or chassis for an UPS system that includes universal bays or slots that can receive either power modules or battery backs. The back plane of the slot has separate terminal connectors for battery packs and power modules. The different types of terminals are arranged at different locations such that the location of the terminal connectors for the battery packs do not interfere with the location of the terminal connectors for the power modules. The slots may also receive battery chargers if so desired. It is an advantage that all of the slots of a chassis can be utilized to full capacity before another cabinet needs to be employed, thereby providing significant space and cost savings. The cabinet is also readily adaptable and can be easily reconfigured as desired without particular concern as to the number of power modules or battery packs that are being used.

It is a feature of the present invention that sensors are provided that indicate the capacity of the cabinet that has been used (e.g. the number of slots still open and not used by a power module or a battery pack). It is a further feature that an indication of the configuration of the UPS system is also provided. Sensors indicate whether a battery pack, power module or other device is inserted into the slot, thereby providing an indication of the specifications of the UPS system as presently configured to the user. The system automatically updates upon removal or insertion of a new module.

It is another feature of the present invention that a universal back plane is provided for each section of the cabinet, thereby eliminating the need to separately install individual back planes for each slot of the cabinet.

Other objects and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 2 is a front view of the electrical cabinet illustrated in FIG. 1;

FIG. 3 is an enlarged fragmentary view of a portion of FIG. 2;

FIG. 4 is a rear isometric view of a battery pack for use with the electrical cabinet illustrated in FIGS. 1–3; and FIG. 5 is a rear isometric view of a power module for use with the electrical cabinet illustrated in FIGS. 1–3.

Figure 1:
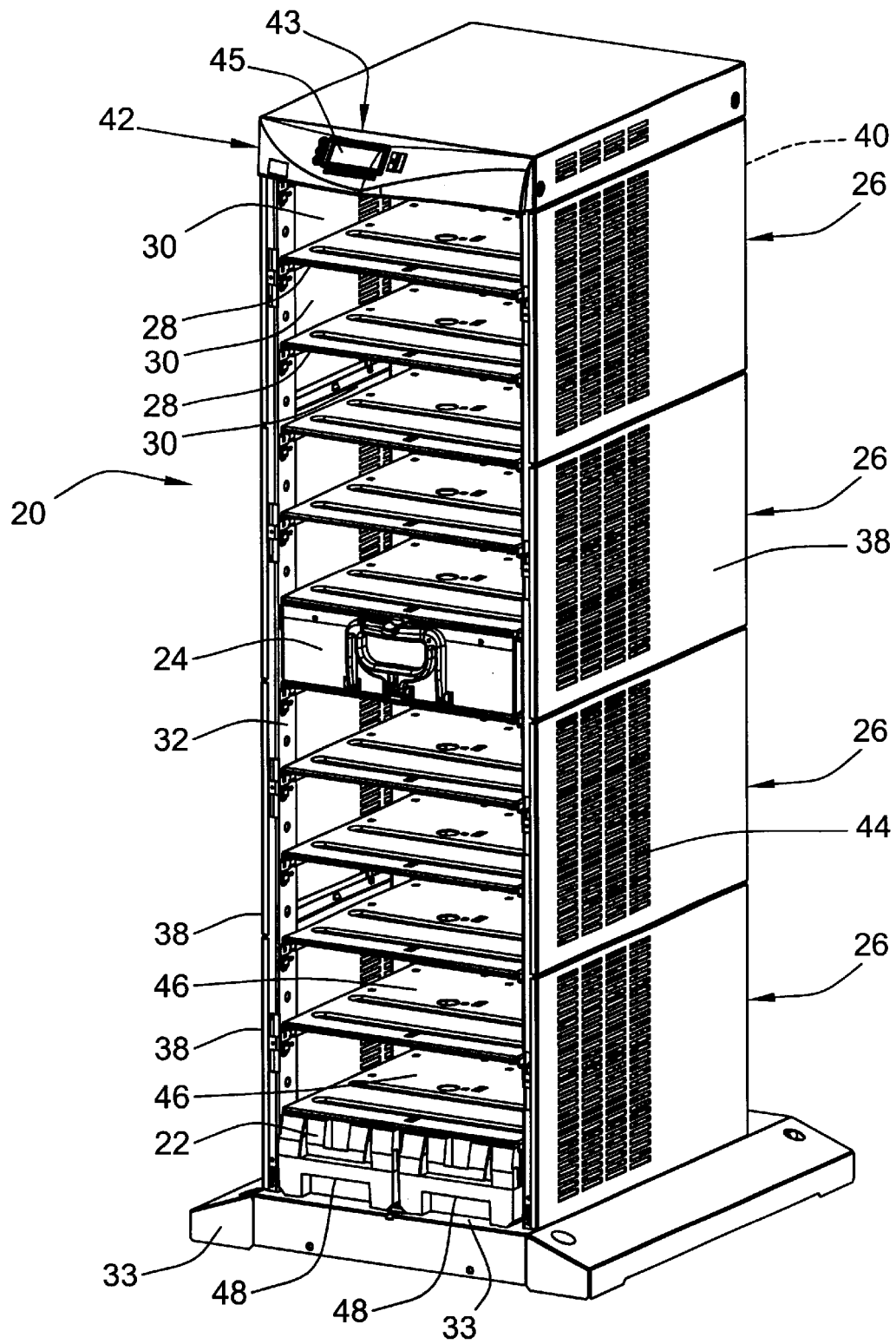
FIG. 1 is a perspective view of an electrical cabinet or chassis for configuring and supporting an UPS system, according to a preferred embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

For purposes of illustration, a preferred embodiment the present invention has been depicted as a modular chassis or electrical cabinet 20 for supporting and organizing battery packs 22, power modules 24 into a universal power system (UPS) for such an exemplary application as providing secondary power supplies to computer networks, telecommunications equipment and any other application where a uninterrupted power source is desired. The cabinet 20 is also capable of holding and battery chargers (not shown) if desired. As illustrated in FIGS. 1 and 2, the cabinet is divided up into individual sections 26 stacked one on top of each other to provide a vertical stack. In this embodiment, each section 26 provides three bays or slots 30 for receiving the battery packs 22 or power modules 24. In this manner, electrical cabinets having only three slots, or alternatively six, nine or twelve or more slots can be readily made. It will be appreciated by those skilled in the art that each section need only have one slot 30, but making each section with multiple slots is advantageous from practicality and manufacturing standpoints. It will also be appreciated that side by side horizontal slots may also be provided in addition to the vertically spaced slots as shown. It should also be noted from the outset that each battery pack 24 includes two laterally side by side batteries 48 in the illustrated preferred embodiment, although it will also be appreciated that fewer or more batteries per pack could also be provided in another embodiment of the invention.

The power supply cabinet 20 may include a support base 32 upon which individual sections 26 can be stacked. The cabinet 20 also includes an outer support housing which can be built out of various materials such as plastic, sheet metal, metal, structural foam, and other similar materials. It should be noted that the actual construction, configuration or materials used in constructing the housing is not of much importance for understanding the present invention. In the illustrated embodiment, each section 26 of the housing includes a metal frame comprises vertical corner support bars 34 built initially on the support base 32. The vertical corner support bars 34 are covered by a front panel (not shown), a back panel 40, and side and panels 38, extending perpendicularly between the front and back panels 36, 40. A top 42 that includes a user interface 43 including a display 45 extends perpendicularly across the top of the front, back and side panels 38, 40. In the illustrated embodiment the panels 38, 40 are formed sheet metal, however other material may be used as indicated previously.

The side panels 38 and back panel 40 also include vents 44 for cooling purposes thereby preventing overheating of a universal power system when in use. In the preferred embodiment and referring to FIG. 2, it will be noted that the vents 44 in the back panel 40 are all along the left hand side of the back panel 40 and recessed a couple of inches rearward from back surface 49 to receive rearwardly projecting fans 70 (FIG. 4) of the power modules 24. In this manner, fans are positioned in direct communication with the vents 44 such that the fans 70 do not interfere with the wires leading to terminal plug-in connectors for the battery packs and power modules. Such fans facilitate cooling of the power modules 24.

To provide the individual slots 30, individual shelves 28 extending horizontally are supported in parallel vertically spaced apart relationship. Like the other panels, the shelves can be readily formed from sheet steel. The corners of the shelves 28 are fastened or otherwise secured to the vertical support bars 32. The shelves 28 also include generally flat and generally smooth top surfaces 46 which allows battery packs or power modules to easily slid and inserted into the slots 30. Upon viewing the drawings it can also be seen that the upper surface of the support base 32 can also provide the first shelf 33 or the bottom surface of the lower most slot 30.

In accordance with the present invention, the slots 30 are universal readily capable of having either the power modules 24 or the battery packs 22 inserted and plugged-in or otherwise electrically connected to the cabinet 20. To accomplish this, different terminal connector locations have been selected for the battery packs 22 and the power modules 24 such that the locations of the respective terminals in each slot 30 do not interfere with one another. The battery packs 22 and the power modules 24 are substantially the same size and are sized closely and just smaller than the size of the slots 30 such that they substantially fill the slot and substantially align and naturally plug into the respective terminal connectors on the back 49 of each slot. Thus, it is not only the cabinet 20 which is novel, but also the battery packs 22 and power modules 24 that are also novel by virtue of their similar sizes and the selected non-interfering locations of the respective terminal connectors.

Referring to FIG. 3, it can be seen that the back 49 of each slot 30 includes separate power module plug-in connectors 50 and battery terminal plug-in connectors 52 at different locations. Because each battery pack 22 includes two separate batteries, each battery pack includes a two sets 53 of positive and negative terminals 54, 56 in the form of projecting prongs or posts. The back 49 of each slot 30 includes two sets of battery terminal plug-in connectors 52 in the form of positive and negative electrical sockets 58, 68 aligned with the terminals 54, 56 for interfitting and electrically connecting with the terminals 54, 56.

Referring to FIG. 3, one of the battery terminal plug-in connectors 52 is located proximate the horizontal center of the slot 30 while the other battery terminal plug-in connector 52 is located on proximate the right end of the slot 30. The power module plug-in connectors 50 are provided horizontally proximate the bottom of the back 49 between the pair of battery terminal plug-in connectors 52. Each power module plug-in connector includes multiple pin sized sockets 62 (each illustrated with fourteen sockets) for interfitting and electrically contacting corresponding interfitting projecting pins 64 arranged in separate sets on the back surface of the power module 24. The number of pins 64 allow for a variety of inputs, outputs and control of the power module 24.

The power module plug-in connectors 50 and battery terminal plug-in connectors 52 also do not interfere with the vents 44 and fans 70 which are aligned along the left hand side.

It is an advantage of the illustrated preferred embodiment that the slots are universal and can either receive a power module 24 or a battery pack 22, as desired to better meet the powering requirements of the particular application. No changes need to be made to the cabinet to switch the number of power modules 24 or battery packs 22 that can be plugged in. It is a further advantage that the full capacity of the cabinet can be utilized before another cabinet is required. It is yet a further advantage that the end user is able to add additional battery packs or power modules or switch locations of battery packs and power modules as desired without concern as to whether the slot is only configured to receive either a battery pack or power module.

It is also a feature of the present invention that only a single back panel 40 is necessary for multiple slots 30 of each individual section 26. This increases the simplicity of the cabinet reducing the amount of assembly required.

It is an aspect of the present invention that the microprocessor of the user interface 43 electronically polls each bay or slot 30 to determine whether a battery pack 22, power module 24 or other device is provided in the slot. In the preferred embodiment the way in which the microprocessor accomplishes this is by measuring electrical activity such as the location of the voltage in each bay. For example, if electrical activity is sensed at the power module plug-in 50 of a particular, then it is determined that a power module is present in that bay. Similarly, if electrical activity is sensed associated with the battery terminal plug-ins 52 in a particular bay, then it is determined that a battery plug in is present in that bay. The microprocessor can also indicate whether there are any defects of the power module or battery packs by comparing sensed voltages or electrical signals to stored normal operating ranges, thereby providing an early warning to a UPS system maintenance technician. The polling is conducted at timed intervals such that the system automatically refreshes to reflect new information as power modules or battery packs are pulled or switched. It will be appreciated that other sensor mechanism also can be used such as using indicator pins in the terminal connection to indicate a particular type of plug-in. Such information can be gathered using the user interface 43 and viewing information on the display 45.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An electrical cabinet for configuring an uninterruptible power system with battery packs and power modules, comprising:
   a support housing;
   a plurality of universal bays defined in the support housing, the bays sized closely to receive either battery packs and power modules;
   a first terminal connector for battery packs positioned at a first location in each universal bay adapted to electrically connect with the battery packs; and
   a second terminal connector for power modules positioned at a second location in each universal bay adapted to electrically connect with the power modules, the first and second terminal connector locations being arranged at separate non-interfering locations.

2. The electrical cabinet of claim 1, further comprising a user interface adapted to indicate which one of the power module and the battery packs is inserted into the universal bay, and whether the universal bay is empty.

3. The electrical cabinet of claim 2, wherein each universal bay comprises at least one sensor indicating to the user interface the type of device positioned in the universal bay.

4. The electrical cabinet of claim 1, wherein the electrical cabinet is modular with the housing being divided into a plurality of sections, each section including at least one universal bay, the sections being stacked vertically one on top of another to provide a selected number of universal bays in the electrical cabinet.

5. The electrical cabinet of claim 1, wherein the power modules include fans, and wherein each universal bay further includes vents positioned to align in close proximity to the fans when the power module is positioned in the universal bay.

6. The electrical cabinet of claim 1, wherein the support housing includes:
   a support base;
   four support bars spaced apart in rectangular relationship extending vertically and parallel from the support base;
   side panels extending vertically and generally parallel between different pairs of the four support posts; and
   a plurality of shelves extending horizontally between the four support posts in spaced apart parallel relationship, universal bays being defined between adjacent shelves; and
   a backplane extending generally perpendicular to the shelves and transversely between the side panels and two of the support bars, the backplane providing the first and second terminal connectors.

7. The electrical cabinet of claim 6, wherein the shelves, the side panels, and the backplane are manufactured from sheet metal material.

8. An electrical cabinet for configuring an uninterruptible power system with battery packs and modules, comprising:
   a support housing;
   a plurality of universal bays, each universal bay sized to receive, alternatively, both battery packs and power modules, and wherein insertion of the battery pack precludes insertion of the power module in that universal bay, and wherein insertion of the power module precludes insertion of the battery pack; and
   an electrical circuit connecting the universal bays, each battery pack electrically connecting to the electrical circuit when positioned in any of the universal bays, each power module also electrically connecting to the electrical circuit when positioned in any of the universal bays.

9. The electrical cabinet of claim 8, further comprising separate terminal connectors for each universal bay adapted to separately connect to the battery packs and power modules.

10. The electrical cabinet of claim 9, wherein the terminal connectors for the battery packs consist of a positive terminal and a negative terminal, and wherein the terminal connectors for the power modules include a plurality of pin plug-in connectors including positive and negative pin plug-ins and control pin plug-ins.

11. The electrical cabinet of claim 8, further comprising a user interface adapted to indicate a status of each universal bay, the status indicating which one of the battery packs and the power module is inserted into the universal bay, and whether the universal bay is empty.

12. The electrical cabinet of claim 11, wherein each universal bay includes at least one sensor indicating to the user interface the type of device positioned in the universal bay.

13. The electrical cabinet of claim 11, wherein the electrical cabinet is modular with the housing being divided into a plurality of sections, each section including at least one universal bay, the sections being stacked vertically one on top of another to provide a selected number of universal bays in the electrical cabinet.

14. An uninterruptible power system, comprising:
   at least one battery pack comprising at least one battery adapted to provide a power supply;

at least one power module adapted to condition the power supply;

an electrical cabinet, comprising:

a plurality of universal bays, each universal bay sized to receive both battery packs and power modules such that insertion of the battery pack precludes insertion of the power module and insertion of the power module precludes insertion of the battery pack; and an electrical circuit operatively connecting the universal bays, wherein the battery packs electrically connect to the electrical circuit when positioned in any of the universal bays, and wherein the power module electrically connects to the electrical circuit when positioned in any of the universal bays.

15. The uninterruptible power system of claim 14, further comprising first and second terminal connectors in each universal bay adapted to separately connect to the battery packs and power modules.

16. The uninterruptible power system of claim 15, wherein the first terminal connectors are adapted to connect to the battery packs, the first terminal connectors including a positive terminal and a negative terminal, and wherein the second terminal connectors are adapted to connect to the power modules, the second terminal connectors including a plurality of pin plug-in connectors including positive and negative pin plug-ins and control pin plug-ins.

17. The uninterruptible power system of claim 14, further comprising a user interface adapted to indicate a status of each universal bay, the status indicating whether the battery packs or the power module is inserted into the universal bay, the status further indicating whether the universal bay is empty, and wherein each universal bay includes a sensor indicating to the user interface the type of device positioned in the universal bay.

18. The uninterruptible power system of claim 14, wherein the electrical cabinet is modular with the housing being divided into a plurality of sections, each section including at least one universal bay, the sections being stacked vertically one on top of another to provide a selected number of universal bays in the electrical cabinet.

19. The uninterruptible power system of claim 18, wherein the support housing includes:

a support base;

four support bars spaced apart in rectangular relationship extending vertically and parallel from the support base;

side panels extending vertically and generally parallel between different pairs of the four support posts;

a plurality of shelves extending horizontally between the four support posts in spaced apart parallel relationship, universal bays being defined between adjacent shelves; and a backplane extending generally perpendicular to the shelves and transversely between the side panels and two of the support bars, the backplane providing the first and second terminal connectors.

20. An electrical cabinet for configuring an uninterruptible power system, the cabinet comprising a plurality of receiving locations each adapted to alternatively receive either one of a power module and battery packs, each receiving location including a first terminal connector and a separate second terminal connector arranged in noninterfering locations to one another.

21. The electrical cabinet of claim 20, further comprising a user interface adapted to provide a status of each receiving location that is indicative of the use of the receiving location.

22. The electrical cabinet of claim 21, wherein each receiving location comprises sensors indicating to the user interface the type of device positioned in the receiving location.

23. The electrical cabinet of claim 20, wherein each receiving location is adapted to receive at least two battery packs, and wherein each the receiving location includes a pair of the first terminal connectors, one first terminal connector for each different battery pack.

24. The electrical cabinet of claim 20, wherein each power module includes a fan, each receiving location including a vent arranged to be in close proximity to the fan of a power module positioned therein.

25. The electrical cabinet of claim 20, wherein the plurality of receiving locations are also adapted to receive a battery charger, and wherein the first terminal connector and the second terminal connector are adapted to electrically connect with the battery charger.

26. An electrical cabinet for configuring an uninterruptible power system with battery packs and modules, comprising:

a support housing;

a plurality of universal bays defined in the support housing, each universal bay sized to alternatively receive either of a battery pack and a power module; and a first terminal connector and a separate second terminal connector arranged in noninterfering locations within each universal bay.

27. The electrical cabinet of claim 26, further comprising a user interface adapted to provide a status of each universal bay that is indicative of the use of the universal bay.

28. The electrical cabinet of claim 26, wherein each universal bay comprises a sensor indicating to the user interface the type of device positioned in the universal bay.

29. The electrical cabinet of claim 26, wherein each battery pack is dimensioned to be approximately one half the width of a power module, such that each universal bay is adapted to receive either of two battery packs side by side or a power module.

30. The electrical cabinet of claim 27, wherein each universal bay is sized to additionally receive a battery charger, and wherein at least one of the terminal connectors for each universal bay is adapted to electrically connect to the battery charger.

31. An uninterruptible power system (UPS), comprising:

an electrical cabinet having a plurality of universal receiving locations defined therein, the universal receiving locations being adapted to alternately receive battery packs and power modules;

a power module positioned within one of the universal receiving locations; and a battery pack positioned within another one of the universal receiving locations.

32. The UPS of claim 31, wherein the universal receiving locations are further adapted to alternatively receive battery chargers, the UPS further comprising a battery charger positioned within a third of the universal receiving locations.

* * * * *